Patented Feb. 9, 1954

2,668,838

UNITED STATES PATENT OFFICE 2,668,838

O-($\beta,\beta,\beta$-TRICHLOROTERTIARYBUTYL) N,N-DIETHYLAMIDOALKANEPHOSPHONATES Henry Tolkmith, Midland, Mich., assignor to The Dow Chemical Company, Midland, Mich., a corporation of Delaware No Drawing. Application April 21, 1953, Serial No. 350,221

3 Claims. (Cl. 260—461)

1

The present invention is directed to the O-($\beta,\beta,\beta$-trichlorotertiarybutyl) N,N-diethylamido-alkane-phosphonates of the formula

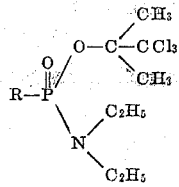

In this and succeeding formulae R represents methyl or ethyl. These compounds are viscous oils, somewhat soluble in many organic solvents and substantially insoluble in water. They are of value as intermediates for the preparation of more complex phosphorus derivatives and as toxic constituents of parasiticide compositions.

The new compounds may be prepared by reacting one molecular proportion of $\beta,\beta,\beta$-trichlorotertiary-butanol with one molecular proportion of an N,N-diethylamidoalkanephosphonic chloride of the formula

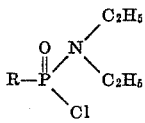

in the inert organic solvent such as benzene, toluene or diethyl ether. The reaction is carried out in the presence of a hydrogen chloride acceptor such as pyridine.

In carrying out the reaction, the $\beta,\beta,\beta$-trichlorotertiarybutanol and pyridine are dispersed in the solvent and the resulting mixture added portionwise with stirring to the N,N-diethylamidoalkanephosphonic chloride dispersed in the same solvent. The resulting mixture is thereafter heated for a short period of time at a temperature of from 30° to 50° C. to complete the reaction. The reaction is somewhat exothermic and takes place smoothly at the temperature range of from 20° to 50° C. The temperature may be controlled by regulation of the rate of contacting the reactants, as well as by the addition and subtraction of heat, if required. Upon completion of the reaction, the mixture may be filtered and the filtrate distilled under reduced pressure at gradually increasing temperatures to separate low boiling constituents and to obtain as a residue the desired product. Distillation temperatures substantially in excess of 150° C. for any appreciable period of time should be avoided as the desired products have a tendency to decompose at such temperatures.

2

The N,N-diethylamidoalkanephosphonic chlorides employed as starting materials in the above-described method may be prepared by reacting one molecular proportion of diethylamine with at least two molecular proportions of an alkanephosphonic dichloride in an inert organic solvent such as benzene. The reaction is carried out in the presence of a hydrogen chloride acceptor, which may conveniently be an excess of the amine reactant. In carrying out the reaction the amine is added portionwise with stirring to the alkanephosphonic dichloride dispersed in the solvent. The reaction is somewhat exothermic and takes place smoothly at temperatures of from 20° to 40° C. The temperature may be controlled by regulation of the rate of contacting the reactants as well as by the addition and subtraction of heat, if required. Upon completion of the reaction, the mixture may be filtered and the filtrate fractionally distilled under reduced pressure to separate the desired product. N,N-diethylamidomethanephosphonic chloride and N,N-diethylamidoethanephosphonic chloride are oily liquids boiling at 135° C. and 140° C., respectively, at 27 millimeters pressure.

*Example 1.—O-($\beta,\beta,\beta$-trichlorotertiarybutyl) N,N-diethylamidomethanephosphonate*

18.5 grams (0.104 mole) of $\beta,\beta,\beta$-trichlorotertiarybutanol and 9.3 grams (0.114 mole) of pyridine were dispersed in 100 milliliters of diethyl ether and the resulting mixture added portionwise with stirring to 17 grams (0.1 mole) of N,N-diethylamidomethanephosphonic chloride dispersed in 50 milliliters of diethyl ether. Following the addition, the mixture was heated for one hour at the boiling temperature and under reflux to complete the reaction. At the end of this period, the reaction product was filtered and the filtrate concentrated by distillation under reduced pressure to a temperature up to 90° C. to obtain as a residue O-($\beta,\beta,\beta$-trichlorotertiarybutyl) N,N-diethylamidomethanephosphonate. The latter is a viscous oil having a refractive index $n/_D$ of 1.5673 at 20° C.

*Example 2.—O-($\beta,\beta,\beta$-trichlorotertiarybutyl) N,N-diethylamidoethanephosphonate*

16 grams (0.09 mole) of $\beta,\beta,\beta$-trichlorotertiarybutanol and 8 grams (0.101 mole) of pyridine were dispersed in 100 milliliters of diethyl ether and the resulting mixture added portionwise with stirring to 15 grams (0.082 mole) of N,N-diethylamidoethanephosphonic chloride dispersed in 50 milliliters of diethyl ether. The reaction mixture was thereafter heated for one hour at the boiling temperature and under reflux to complete the reaction. At the end of this period, the mixture was filtered and the filtrate concentrated by distillation under reduced pressure to a temperature up to 90° C. to obtain as a residue an O-($\beta,\beta,\beta$-trichlorotertiarybutyl) N,N-diethylamidoethanephosphonate product. The latter is a viscous oil having a refractive index $n/_D$ of 1.5660 at 20° C.

The new O - ($\beta,\beta,\beta$ - trichlorotertiarybutyl) N,N-diethylamidoalkanephosphonates have been tested and found effective as parasiticides and are adapted to be employed for the control of a wide range of agricultural and household pests such as flies, mites, aphids, beetles and cockroaches. For such use, the compounds may be dispersed on an inert finely divided solid and employed as a dust. Also, such mixtures may be dispersed in water with the aid of a dispersing and wetting agent and the resulting aqueous suspensions employed as sprays. In other procedures, the new products may be employed in oils, as constituents in oil-in-water emulsions, or in water dispersion with or without the addition of emulsifying, wetting or dispersing agents. Suitable concentrations of the toxicants in dusts are in the order of from about 0.1 to 10 percent by weight of the dust and in liquid suspensions from about 0.1 to 3 pounds per 100 gallons of the spray mixture.

This is a continuation in part of my copending application Serial No. 203,748, filed December 30, 1950.

I claim:

1. An O-($\beta,\beta,\beta$-trichlorotertiarybutyl) N,N-diethylamidoalkanephosphonate of the formula

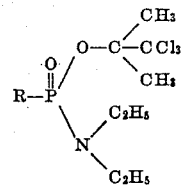

wherein R represents a member of the group consisting of methyl and ethyl.

2. O-($\beta,\beta,\beta$-trichlorotertiarybutyl) N,N-diethylamidomethanephosphonate.

3. O-($\beta,\beta,\beta$-trichlorotertiarybutyl) N,N-diethylamidoethanephosphonate.

HENRY TOLKMITH.

No references cited.